United States Patent [19]

Caron et al.

[11] 4,039,748
[45] Aug. 2, 1977

[54] METHOD AND DEVICE FOR SYNCHRONIZING THE RECEIVER CLOCK IN A DATA TRANSMISSION SYSTEM

[75] Inventors: Francois Gabriel Caron, Cagnes-sur-Mer; Andre Eugene Desblache, Nice; Dominique Noel Godard, Le Rouret; Francis Paul Maddens, Cagnes-sur-Mer, all of France

[73] Assignee: International Business Machines Corporation, Armonk, N.Y.

[21] Appl. No.: 674,787

[22] Filed: Apr. 8, 1976

[30] Foreign Application Priority Data

Apr. 25, 1975 France .................................. 75.1402

[51] Int. Cl.² .............................................. H04L 7/02
[52] U.S. Cl. ..................................... 178/69.1; 328/153
[58] Field of Search .................... 329/122; 325/60, 63, 325/321, 418, 419, 420, 423; 178/69.1, 88, 53; 328/72, 74, 133, 155; 307/295

[56] References Cited

U.S. PATENT DOCUMENTS

| 3,372,335 | 3/1968 | Takada .............................. 325/63 X |
| 3,378,770 | 4/1968 | Daquet ................................. 325/60 |
| 3,743,775 | 7/1973 | Hutchinson ........................ 178/69.1 |

Primary Examiner—Benedict V. Safourek
Attorney, Agent, or Firm—Delbert C. Thomas

[57] ABSTRACT

A clock setting circuit is provided at a receiving modem for adjusting the phase of a timing signal defining the signal sampling instants. The received signal is filtered in two filters to derive a first signal having a phase $\phi_1$ and a frequency $f_1$ equal to $f_c - \frac{1}{2}T$, $f_c$ being the carrier frequency and $1/T$ being the transmission baud rate, and a second signal having a phase $\phi_2$ and a frequency $f_2$ equal to $f_c + \frac{1}{2}T$. The first and second derived signals are combined to derive an error signal indicative of the phase difference $\phi_2 - \phi_1$ which difference is used for adjusting the phase of a phase locked oscillator which provides the timing signal.

8 Claims, 11 Drawing Figures

FILTER F

METHOD AND DEVICE FOR SYNCHRONIZING THE RECEIVER CLOCK IN A DATA TRANSMISSION SYSTEM

BACKGROUND OF THE INVENTION

This invention generally relates to synchronous transmission systems wherein digital data is transmitted over a transmission medium between a transmitter and a receiver. More particularly, the invention relates to a method of synchronizing the local clock in the receiver with the received signal so that the clock can be used to define the signal sampling instants. The invention also relates to a clock control device which utilizes said method and is located upstream of the essential, conventional circuits of the receiver such as the equalizer, the demodulator and the data detection circuit.

In a transmission system, the outgoing information is represented by certain characteristics of the signal transmitted at specific instants called signaling instants which are separated by a fixed time interval or period T. To recover such information, it is necessary that, upon receipt of the signal sent over the transmission medium, the signaling instants be identified with as much precision as possible to allow sampling of the data being transmitted at the correct instant; and the method described for such identification will be referred to hereafter as a synchronization operation.

The present invention can be used in a data receiver wherein the received signal is sampled under the control of a clock signal generator in the receiver, which generator functions to cause samples of the incoming signal to be taken as close as possible to signaling instants as determined at the receiver.

In this type of transmission receiver, the usual method of performing the synchronization operation consists in selecting a clock signal rate that will be as close as possible to the signaling rate 1/T utilized at the transmitting end to define the data rate, and in then precisely adjusting the phase and the frequency of the clock signals by means of control signals transmitted before and during transmission of the data proper. Actually, the adjustment involves several operations that are practically independent: i.e., prior to the first data transmission, the system is initialized and the phase of the receiver's clock signal generator is synchronized with a received control signal, then at the beginning of each transmission, a resynchronization takes place and the phase of the clock is adjusted again; and finally, during each transmission, successive small corrections of the clock are made as a function of information extracted from the received signals.

One of the many solutions that have been proposed to solve the problem of maintaining synchronization of the clock of the receiver during data transmission consists in obtaining the information required to control said clock adjustments from a signal which is superimposed on the incoming data signal, rather than the latter signal. The major disadvantage of this solution is that it introduces a source of additional noise in the transmission.

Another prior art solution consists in sending a pilot tone on each side of the frequency spectrum of the data signal and in extracting therefrom the receiver's clock control information. The disadvantage of this solution is that it reduces the portion of the passband of the transmission medium available for data information.

It has also been proposed to extract the clock control information from the equalized data signal. However, the extraction of such information requires a number of samples per period T that is much larger than the number of samples the equalizer would need to perform the equalization function alone if it is assumed that the sampling instants at the receiving end are already synchronized with the signaling instants of the received signal.

OBJECTS OF THE INVENTION

Accordingly, it is a main object of the present invention to provide a method and a control device for synchronizing the receiver's clock signal generator which permit deriving the information needed to control the phase of the signals supplied by the receiver clock generator from the data signal received directly from the transmission medium.

Another object of the invention is to provide a control device for synchronizing the receiver's clock signal generator which device enables a reduction in the length of the equalizer and improves the convergence time thereof.

Another object of the invention is to provide a control device for controlling the clock signal generator which enables the adjusting of the phase of the clock signals prior to data transmission, by deriving the control information from an initialization sequence, and then during transmission, controls phase adjustment by deriving the control information from the data signal itself.

These and other objects are attained in a general way by means of a synchronization method wherein the clock control signal, which determines the instants at which the signal being received is to be sampled, is obtained by processing that received data signal.

The signal being received is the information-carrying signal, and the clock control signal is obtained by causing the signal received to pass simultaneously through a first filter to obtain a signal S1 of frequency $f_1$ and phase $\phi_1$, and through a second filter to obtain a signal S2 of frequency $f_2$ and phase $\phi_2$. Frequencies $f_1$ and $f_2$ are equal to $f_c - \frac{1}{2}T$ and $f_c + \frac{1}{2}T$ respectively, with $f_c$ being the signal carrier frequency and 1/T the signaling rate expressed in bauds.

Signals S1 and S2 are then combined to generate a third signal S3 which is indicative of the phase differential $\phi_1 - \phi_2$ and is used as a control signal to adjust the phase of the clock signal generator so as to reduce the phase differential $\phi_2 - \phi_1$ to zero.

Before transmitting any data, an initialization sequence is sent, and the received signal is dealt with in the above manner to derive therefrom the signal which serves to initially adjust the phase of the clock signal generator.

The foregoing and other objects, features and advantages of the invention will be apparent from the following more particular description of preferred embodiments of the invention, as illustrated in the accompanying drawings.

DESCRIPTION

Figure 1:
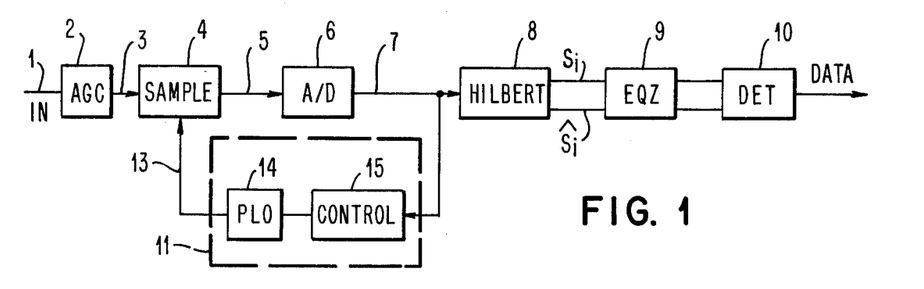
FIG. 1 is a block diagram of a data receiver incorporating the synchronization circuit of the present invention.

Referring now to FIG. 1, the main components of a data receiver incorporating the device of the present invention are shown.

Generally, a data receiver comprises an input 1 which receives the signal sent over the transmission medium. This signal is first applied to an automatic gain control (AGC) circuit 2 which provides on its output line 3 a constant amplitude signal from which the receiver will detect the data. To this end, the signal present on line 3 is sampled in a sampling circuit 4. This circuit supplies on its output line 5, the values of the input signal samples at a rate $1/\tau$, which is a multiple $m/T$ of the signaling rate. The amplitude values of the samples are each converted in an analog-to-digital (A/D) converter 6 and then fed on output 7 to a Hilbert transformer 8 which supplies on one of its outputs the samples $s_i$ of the input signal and on its other output the Hilbert transforms, $\hat{s}_i$, of these samples. A bandpass equalizer 9 receives $s_i$ and $\hat{s}_i$ and feeds them, after equalization, to a data detector 10. Circuits 8, 9, 10, which form no part of the invention, are of a type conventionally used in data receivers and, consequently, will not be described in detail. The equalizer can be implemented in the manner described, for example, in French Pat. application No. 73 26404 filed by the same assignee on July 12, 1973 and corresponding to assignees U.S. Pat. No. 3,947,768, issued Mar. 30, 1976 to A. E. Desblache et al.

In order for the receiver to operate properly, the samples of the received signal must be taken at the appropriate signaling instants. Accordingly, provision must be made for a synchronization circuit 11 to time the samplings performed in circuit 4 in such a way that the sampling control signal will allow samples of the received signal to be taken at the proper signaling instants within a signal period.

In accordance with the invention, the synchronization circuit 11 is inserted in a feedback loop. In a preferred embodiment of the invention, circuit 11 receives via its input line 7 the digital values of the samples, extracts therefrom a phase error signal, and provides on its output line, at the rate of $1/\tau$, the sampling signal having the phase characteristic needed to satisfy the synchronization condition. Obviously, circuit 11 will be comprised of digital elements since it is intended to process the digital signals on line 7. However, an analog circuit 11 could also be developed in which the circuit would receive the sampled signal from line 5 and extract therefrom the phase error signal to control sampling circuit 4 in the manner previously described.

Circuit 11 includes a phase-locked oscillator (PLO) 14 that provides a sampling signal having a known frequency $1/\tau$ and a controllable phase. Such PLO circuits, whether analog or digital, are well known in the art. Generally, a digital PLO includes a quartz oscillator circuit that provides a high-frequency sinusoidal signal. This signal is squared and the resultant pulses are applied to a set of frequency dividers that supply the output signal at the desired frequency. By temporary variation of the division ratios, one can cause the phase of the pulses provided by the oscillator to vary. This phase variation is effected under the control of a phase error signal generated by a circuit 15, several digital embodiments of which will later be described, from the input signal samples.

Before describing these embodiments, it will be helpful to discuss the principle underlying the extraction of the phase error signal which is necessary for the purposes of the synchronization operation.

Figure 2A:
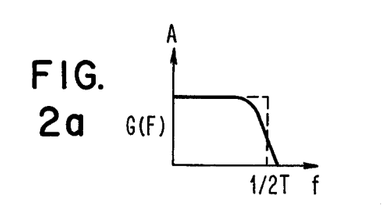
FIGS. 2a, 2b and 2c show the spectrum of the transmitted signal before modulation, after modulation and after sampling at 1/T, respectively.
Figure 2B:
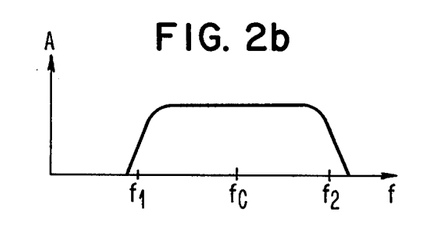

At the transmitting end, a signal element $g(t)$ is made to correspond to each data character. The baseband spectrum $G(f)$ between frequencies 0 and $\frac{1}{2}T$ of signal element $g(t)$ is shown in FIG. 2a. The modulation used to transmit this signal element consists in multiplying the signal by a sinusoidal carrier of frequency $f_c$ and causes the spectrum to be translated to a band around frequency $f_c$. Thus, the corresponding spectrum is bounded by frequencies $f_1 = f_c - \frac{1}{2}T$ and $f_2 = f_c + \frac{1}{2}T$, which are known as the Nyquist frequencies. The modulated spectrum is shown in FIG. 2b. Reference for more detailed information may be made to "Principles of Data Communication" by R. W. Lucky, J. Salz and E. J. Weldon, Jr., McGraw-Hill Book Company, pages 50–51.

If samples of the received modulated signal element are taken by circuit 4 at instants which coincide exactly with the signaling instants of the received signal, then the phases at the sampling time of the signals obtained by simultaneously passing the received signal through a couple of narrow-bandpass filters centered at frequencies $f_1$ and $f_2$, respectively, will be equal. The detected phases of these filtered signals will be called $\phi_1$ and $\phi_2$, respectively. This equal phase property is utilized in circuit 11 to generate the error signal that serves to adjust the timing of the sampling signal applied via line 13 to sampling circuit 4.

Figure 2C:
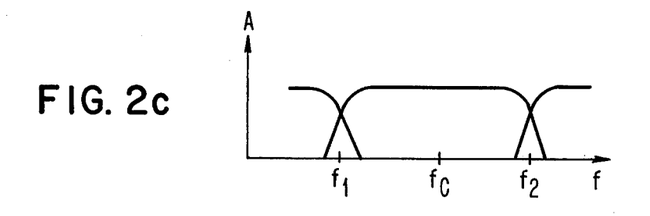

A problem may arise when the digitized sampled signal, that is, the signal present on line 7, is filtered since a sampling operation performed at a frequency $f_s$ will create a repetition of the signal spectrum around frequencies $f_c + kf_s$ ($k$ being an integer). Consequently, if the received signal is sampled at the frequency $f_s = f_o = 1/T$, a folding of the spectrum about the Nyquist frequencies $f_1$ and $f_2$ will occur in the absence of distortion, as shown in FIG. 2c. Since, in this instance, the folded spectrum is periodic, its period being $1/T$, the phase $\phi_1$ and $\phi_2$ information cannot be reconstructed if the sampling is at frequency $f_o = 1/T$.

In order, therefore, to obtain such information, the sampling is performed at a higher rate $1/\tau$, which is a multiple $m/T$ of the signaling rate $1/T$. In an actual embodiment, m was made equal to 6. Such a sampling rate also provides, during one period T, a sufficient number (6) of samples to adequately define the input signal.

Figure 3:
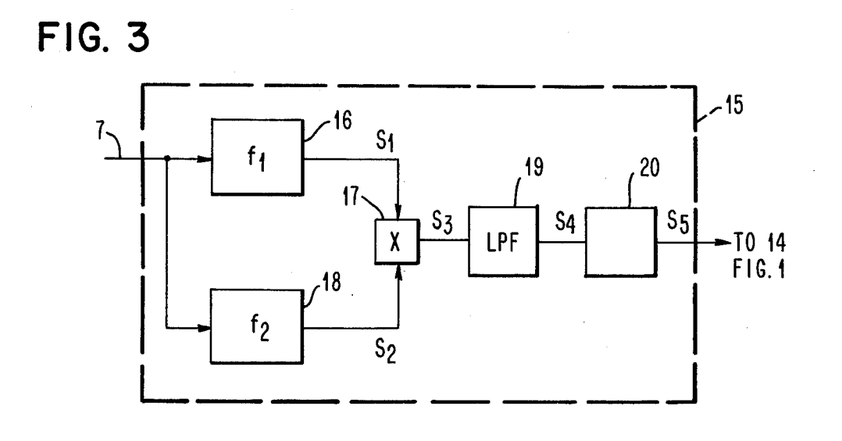
FIG. 3 illustrates a first embodiment of the control circuit 15 of FIG. 1.

In a first embodiment of the circuit 15 as shown in FIG. 3, the sampled digital signal present on line 7 (of the circuit of FIG. 1) is fed to a first digital narrow-bandpass filter 16 having a center frequency $f_1$. Filter 16 provides at the sampling instants $k\tau$ a signal of the approximate form $$s_1(k\tau) = A_1 \cos (2\pi f_1 k\tau + \phi_1) \qquad (1)$$

This signal $s_1(k\tau)$ is then fed to one input of a multiplier 17.

The signal present on line 7 is also fed to a narrow-bandpass filter 18 having a center frequency $f_2$. Filter 18 provides the other input of multiplier 17 with a signal of the form $$s_2(k\tau) = A_2 \cos (2\pi f_2 k\tau + \phi_2) \qquad (2)$$

Multipilier 17 then supplies the product of the two values $s_1(k\tau)$ and $s_2(k\tau)$, i.e.

$$s_3(k\tau) = A_1 A_2 \cos (2\pi f_1 k\tau + \phi_1) \cos (2\pi f_2 k\tau + \phi_2)$$

which can also be written as $$s_3(k\tau) = A_3 \{\cos [2\pi (f_2 - f_1) k\tau + (\phi_2 - \phi_1)] + \cos [2\pi (f_2 + f_1) k\tau + (\phi_2 + \phi_1)]\}$$

This signal is fed to a low-pass filter 19 to eliminate the term $\cos [2\pi (f_2 + f_1) k\tau + \phi_2 + \phi_1]$ of frequency $f_2 + f_1$.

Accordingly, the signal obtained at the output of filter 19 is $$s_4(k\tau) = A_3 \cos [2\pi (f_2 - f_1) k\tau + \phi_2 - \phi_1] \qquad (3)$$

Signal $s_4(k\tau)$ is fed to a circuit 20 designed to extract from $s_4(k\tau)$ a signal $s_5$ which is some function $S$ of $\phi_2 - \phi_1$ and may be of the form $A_4 \sin (\phi_2 - \phi_1)$. Signal $s_5$ is equal to zero when $\phi_2 - \phi_1 = 0$, that is, when the samples are taken at the appropriate instants. Signal $s_5$ is, therefore, the error signal serving to control the oscillator 14.

Filters 16, 18, 19 and circuit 20 can be implemented by means of any circuit capable of performing the functions previously described. Specific implementations of these circuits are shown in FIGS. 4 and 5.

Figure 4:
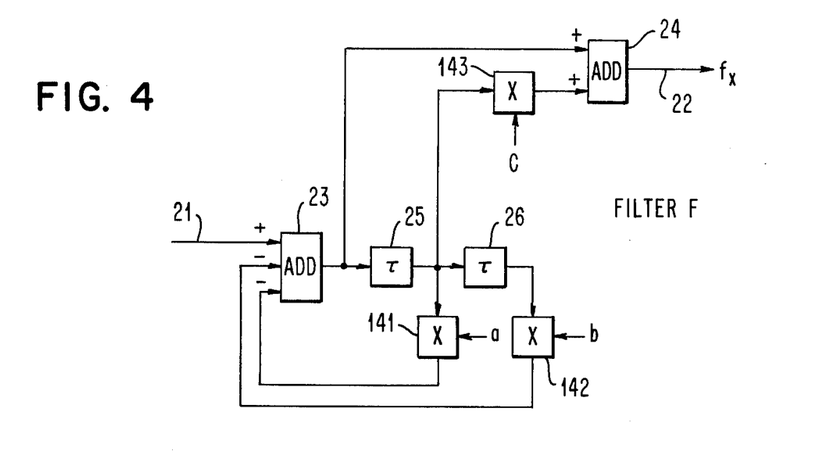
FIG. 4 is a schematic diagram of a filter which can be used as either or both of filters 16 or 18 of FIG. 3.
Figure 5:
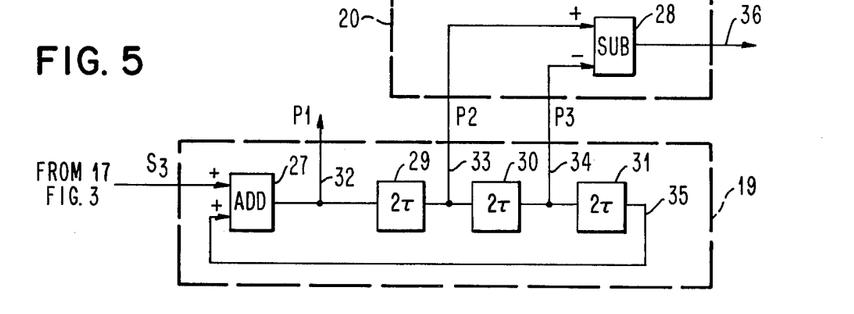
FIG. 5 is a schematic diagram of circuits 19 and 20 of FIG. 3.

Referring now to FIG. 4, there is depicted a schematic diagram of a filter F which can be used to extract the frequency component $f_x$ from an input signal.

Filter F must meet two requirements: its transfer function $H(f)$ must tend towards infinity for $f = f(x)$; in addition, the filter must introduce no phase shift, otherwise it will not be possible to obtain an exact indication of the phase of the input signal at its output.

Both requirements are met in a narrow-bandpass recursive digital filter whose z transform of the transfer function is of the form:

$$H(z) = \frac{1 + cz^{-1}}{1 + az^{-1} + bz^{-2}}$$

where
$a = -2\mu \cos 2\pi f_{(x)} \tau$
$b = \mu^2$
$c = -\mu \cos 2\pi f_{(x)} \tau$
$\mu$ is a constant value close to unity.

A filter exhibiting such a transfer function is illustrated in FIG. 4.

The signal to be filtered is applied to the input 21 of filter F and the frequency component $f_{(x)}$ of this signal is obtained at the output 22.

The filter comprises two digital adders/subtractors 23 and 24, two delay elements 25 and 26 each of which introduces a delay equal to the sampling interval $\tau$ (these elements may consist of two stages of a shift register), and three digital multipliers 141, 142, 143 which perform multiplications of signal samples by coefficients $a$, $b$ and $c$, respectively.

Filters 16, 18 are comprised of the same elements as filter F with the values of the coefficients changed, and the coefficient values specific to each filter are derived from the general expressions given above by putting $$f_{(x)} = f_1, f_{(x)} = f_2$$

Thus, two sets of coefficients
$a_1, b_1, c_1$; and $a_2, b_2, c_2$;
are obtained for use with the filter multipliers 141, 142, and 143 in the $f_1$ and $f_2$ filters.

Referring now to FIG. 5, there is depicted a detailed diagram of an assembly which can be used as circuits 19 and 20 of FIG. 3 for generating the error signal $s_5$.

This assembly includes an adder 27 and three delay elements 29, 30 and 31 comprising low pass filter 19 and a subtractor 28 comprising circuit 20. Each delay element introduces a delay equal to $2\tau$ (or $2T/m = T/3$) in the particular example example where $m = 6$). The delay elements 29–31 are provided with four taps 32–35. Adder 27 has one of its inputs connected to receive $s_3$ from the output of multiplier 17, FIG. 3, while its other input is connected to tap 35. Signals $P_1$, $P_2$ and $P_3$ are obtained at taps 32, 33 and 34, respectively. Subtractor 28 has two inputs respectively connected to taps 33 and 34 to receive signals $P_2$ and $P_3$, and provides the error signal at its output line 36.

The circuit operates as follows. Let us consider a signaling period T. At time $nT$, the signal $P_1$ obtained at tap 32 will be:

$$P_1 = A_3 \cos (\frac{2\pi}{T} \cdot nT + \phi_2 - \phi_1) = A_3 \cos (\phi_2 - \phi_1) \qquad (4)$$

The signal $P_2$, as obtained at tap 33, corresponding to the sample taken at time $nT - T/3$ will be:

$$P_2 = A_3 \cos (\frac{2\pi}{3} + \phi_2 - \phi_1) \qquad (5)$$

The signal $P_3$ corresponding to the sample taken at time $nT - 2T/3$, as obtained at tap 34, will be:

$$P_3 = A_3 \cos (\frac{4\pi}{3} + \phi_2 - \phi_1) \qquad (6)$$

Signals $P_2$ and $P_3$ are fed to subtractor 28, which provides:

$$P_2 - P_3 = A_3 \sqrt{3} \sin (\phi_2 - \phi_1) \qquad (7)$$

This signal on output line 36, is equal to zero when $(\phi_2 - \phi_1) = 0$, that is, where the phase of oscillator 14 of FIG. 1 is such that sampling is being made at the correct sample times, and is used as error signal to control that oscillator 14.

A disadvantage of this first embodiment of control circuit 15, as shown in FIG. 3, is that it requires a digital filter 19 to eliminate the frequency component $f_1 + f_2$, and a subtractor circuit 20 to change the form of the error signal from cosine to sine, even though the use of the sine function enables a more precise phase adjustment since the error signal is equal to zero whenever oscillator 14 is locked on the correct phase.

Circuits 19 and 20 also introduce delays the effect of which is to increase the processing time; and furthermore, these circuits require the performance of a substantial number of calculations per period.

Figure 6:
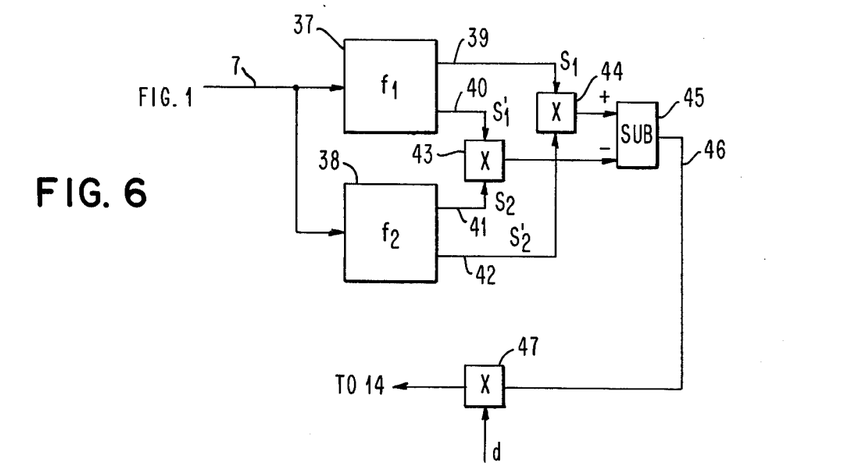
FIG. 6 illustrates a second embodiment of the control circuit 15 of FIG. 1.

A second embodiment of circuits 19 and 20, which is free from the aforementioned disadvantages, is shown in FIG. 6. This second embodiment includes two narrow-bandpass filters 37 and 38 which are centered at frequencies $f_1$ and $f_2$, respectively. Each of these filters has two outputs, designated 39, 40 for filter 37 and 41, 42 for filter 38. The signals obtained at outputs 40 and 42 are in quadrature with the signals available at outputs 39 and 41. Any type of filter capable of performing these functions can be used. An implementation of a suitable digital filter will be described hereafter in connection with FIG. 9.

Outputs 40 and 41 are connected to a digital multiplier 43 and outputs 39 and 42 are connected to a digital multiplier 44. The outputs from multipliers 43 and 44 are fed to a subtractor 45 which provides the error signal on its output line 46. This error signal is then applied to a multiplier 47 in which it is multiplied by a coefficient d to minimize the steady-state phase error, as will be explained later.

The signal applied to the input of filters 37 and 38 is always comprised of samples of the input signal, and the output signals respectively obtained at 39, 40, 41 and 42 are:

$$s_1(k\tau) = A_1 \cos(2\pi f_1 k\tau + \phi_1) \text{ at } 39 \qquad (1)$$

$$s_1'(k\tau) = A_1 \sin(2\pi f_1 k\tau + \phi_1) \text{ at } 40 \qquad (1')$$

$$s_2(k\tau) = A_2 \cos(2\pi f_2 k\tau + \phi_2) \text{ at } 41 \qquad (2)$$

$$s_2'(k\tau) = A_2 \sin(2\pi f_2 k\tau + \phi_2) \text{ at } 42 \qquad (2')$$

Subtractor 45 performs the operation
$$s_2'(k\tau)s_1(k\tau) - s_2(k\tau)s_1'(k\tau) = A_3 \sin[2\pi(f_2-f_1)k\tau + \phi_2-\phi_1] \qquad (8)$$

The frequency component $f_1 + f_2$ no longer appears, thereby eliminating the need for performing an additional filtering operation on the error signal.

If the phase error is calculated once per period, for example at nT, one obtains:

$$s(nT) = A_3 \sin[2\pi \frac{nT}{T} + (\phi_2 - \phi_1)] = A_3 \sin(\phi_2 - \phi_1) \qquad (9)$$
$$= A_3 \sin \phi$$

since $f_2 - f_1 = 1/T$.

Conventionally, this error signal is applied to the feedback loop including the multiplier 47, which multiplies the signal by a coefficient d, and the phase-locked oscillator 14, which acts as an integrator since the various phase corrections made at every signaling instant are added to each other.

The steady-state operation of the feedback loop will now be analyzed to calculate its gain $\gamma_1$ to be used as multiplication coefficient d.

For a first step, we shall assume that the frequency of the receiver's clock is correct.

The signaling instant $t_n$ can be expressed, as a function of the signaling instant $t_{(n-1)}$, by:

$$t_n = t_{n-1} + T - \gamma_1 s[(n-1)T] \qquad (10)$$

s(n−1)T being the phase error yielded by expression (9). Since instants $t_{n-1}$, $t_{n-2}$, etc., can be expressed in a similar manner, expression (10) can be written as:

$$t_n = nT - \gamma_1 \sum_{i=1}^{n-1} [s(iT)] \qquad (11)$$

If no account is taken of the delay introduced by filters 37 and 38, then the signal expression (8) at instant $t_n$ can be written as $$s(t_n) = A_3 \sin[\phi_o - 2\pi f_o \gamma_1 \sum_{i=1}^{n-1} s(iT)] \qquad (12)$$

where $\phi_o$ is the initial phase error and $f_o$ is equal to $f_2 - f_1 = 1/T$.

If we call $\phi_n$ the phase error at instant $t_n$, we have $$\phi_n = \phi_o - 2\pi f_o \gamma_1 \sum_{i=1}^{n-1} s(iT) \qquad (13)$$

and, replacing s(iT) by the value given in expression (9), $$\phi_n = \phi_o =_o - 2\pi f_o \gamma_1 A_3 \sum_{i=1}^{n-1} \sin \phi_{(i)} \qquad (14)$$

From expression (14), the value of $\phi_{n+1}$ can be written as $$\phi_{+1} = \phi_n - 2 f_o \gamma_1 A_3 \sin \phi_{(n)} \qquad (15)$$

The steady-state phases $\phi_{(n+1)}$ and $\phi_{(n)}$ are equal to $\phi_\infty$ which is the steady-state phase error. Such errors are assumed to be of low magnitude, so that (15) can be written as $$\phi_{(n+1)} = \phi_n(1 - 2\pi f_o \gamma_1 A_3) \qquad (16)$$

Thus, convergence is obtained for $$\gamma_1 < \tfrac{1}{2}\pi f_o A_3 \qquad (17)$$

A factor d whose value corresponds to $\gamma_1$ is therefore applied to multiplier 47 to obtain a steady-state phase error equal to zero.

We shall now consider the operation of this loop of the first order when there exists a difference $\Delta f$ between the frequency of the transmitter's clock as received and that of the receiver's clock.

In such a case, the signal present on line 46 at the $n^{th}$ signaling instant becomes:

$$s(t_n) = A \sin[\phi + 2\pi\Delta f nt - 2\pi(f_o + \Delta f) \gamma_1 \sum_{i=1}^{n-1} s(iT)]. \qquad (19)$$

In that case, the phase error is $$\phi_{(n)} = \phi_o + 2\pi\Delta f nT - 2\pi(f_o + \Delta f) \gamma_1 \sum_{i=1}^{n-1} s(iT) \qquad (20)$$

hence $$\phi_{(n+1)} - \phi_{(n)} = 2\pi \Delta f T - 2\pi (f_o + \Delta f) \gamma_1 A_3 \sin \phi_{(n)} \quad (21)$$

The steady-state phase error is obtained by putting $$\phi_{(n)} = \phi_{(n+1)} = \phi_x,$$

which gives $$\sin \phi_{(n)} = \frac{\Delta f \cdot T}{\gamma_1 A_3 (f_o + \Delta f)} \quad (22)$$

Therefore, it is necessary that $$\frac{\Delta f \cdot T}{\gamma_1 A_3 (f_o + \Delta f)} < 1 \quad (23)$$

From expression (22), it may be appreciated that the phase error $\phi_n$ can never be equal to zero when frequency drift is present. Consequently, the error can be minimized by effecting a compromise between the requirements of expressions (17) and (23) to select the value $\gamma_1$ to be used as multiplication coefficient $d$.

Expression (17) indicates that value $\gamma_1$ should be low whereas expression (23) implies that $\gamma_1$ should be high. Accordingly, it is necessary, in order to take frequency drift into account, to use a feedback loop of the second order such as that employed in the third embodiment illustrated in FIG. 7.

Figure 7:
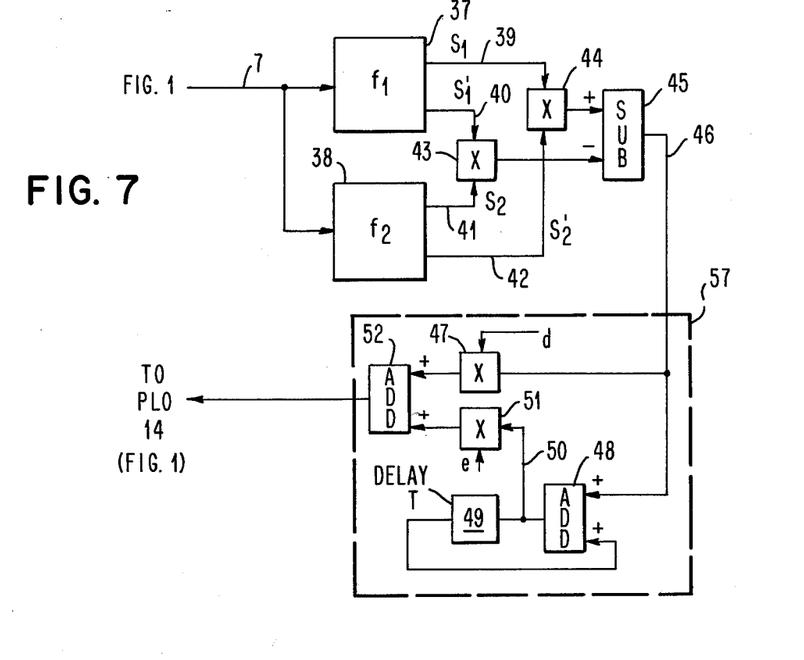
FIG. 7 illustrates a third embodiment of the control circuit 15 of FIG. 1.

This third embodiment includes the same components as the second embodiment shown in FIG. 6, namely, filters 37 and 38, multipliers 43 and 44, subtractor 45 and multiplier 47. These components have the same functions as in the second embodiment previously discussed and, consequently, their operation need not be described again.

The modification of the embodiment of FIG. 7 is that a circuit 57 has been placed at the output 46 of adder 45. This circuit includes the multiplier 47 and a second loop including an adder 48 which receives the signal present on line 46 as expressed by formula (9). The output of adder 48 is connected to a delay element 49, the output of which is returned to the second input of adder 48. The signal present at the output terminal 50 of adder 48 is connected to a digital multiplier 51, which multiplies the signal by a coefficient $e$. The outputs from multipliers 47 and 51 are added together in a third adder 52.

We shall now discuss the steady-state operation of this loop of the second order. Expression (10) becomes $$t_{(n)} = t_{(n-1)} + T - \gamma_1 s [(n-1)T] - \gamma_2 \sum_{i=1}^{n-1} s(iT) \quad (24)$$

If we perform the same mathematical operations as in the case of the loop of the first order, the steady-state phase error $\phi_{(n)}$ can be defined as $$\phi_{(n)} = \phi_o + 2\pi \Delta f n T - 2\pi (f_o + \Delta f) \gamma_1 A_3 \sum_{i=1}^{n-1} \sin \phi_{(i)} \quad (25)$$
$$- 2\pi (f_o + \Delta f) \gamma_2 A_3 \sum_{i=1}^{n-1} \sum_{j=1}^{i} \sin \phi_{(j)}$$

$\phi_{(n+1)}$ and $\phi_{(n-1)}$ can be derived from Eq. (25), in which case one obtains $$\phi_{(n+1)} - 2\phi_n + \phi_{n-1} = 2\pi (f_o + \Delta f) A_3 [\gamma_1 \sin \phi_{n-1} - (\gamma_1 + \gamma_2) \sin \phi_{(n)}] \quad (26)$$

Where the phase errors are of relatively low magnitude, Eq. (26) can be written as $$\phi_{(n+1)} - 2[1 - \pi(f_o + \Delta f)(\gamma_1 + \gamma_2)A_3]\phi_n + [1 - 2\pi(f_o + \Delta f)A_3\gamma_1]\phi_{(n-1)} = 0 \quad (27)$$

The fastest convergence will be obtained by putting $$\gamma_1 = \gamma_2 = \tfrac{1}{2}\pi(f_o + \Delta f) A_3$$

These coefficients are the coefficients d and e which are applied to multipliers 47 and 51.

The output of adder 52 provides the phase-locked oscillator 14 with the error signal that is used to control this oscillator.

Figure 8:
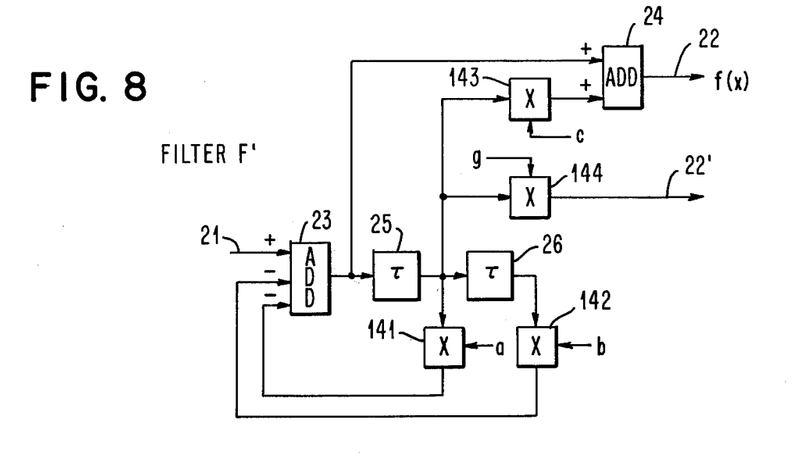
FIG. 8 is a schematic diagram of another filter F'.

A schematic drawing of a filter F′ which can be used as filter 37 or 38 in the embodiments of FIGS. 6 and 7 is shown in FIG. 8.

Filter F′ is partly identical with filter F in that it also includes elements 23–26 and multipliers 141–143. The frequency component $f_{(x)}$ is obtained at output 22 without any filter introduced phase shift. Filter F′ includes an additional output 22′ which is connected to the node between delay elements 25 and 26 through a digital multiplier 144 which multiplies the value of the signal applied thereto from the node by a coefficient $g$.

The transfer function of the circuit composed of adder 23, delay elements 25 and 26, and multipliers 141, 142, and 144, is as follows:

$$H(z) = \frac{gz^{-1}}{1 + az^{-1} + bz^{-2}}$$

By putting $g = \mu \sin 2\pi f_x \tau$, one obtains at output 22′ a signal which is in quadrature with the signal obtained at output 22.

In the embodiments of FIGS. 6 and 7, two separate filters 37 and 38 have been shown. Obviously, since the response times of these filters are short in comparison with period T and since their output signals are processed once per period to obtain the error signal, one could use a single filter associated with a memory wherein the sets of coefficients $a_1$, $b_1$, $c_1$ and $g_1$; $a_2$, $b_2$, $c_2$ and $g_2$ would be stored, this filter being multiplexed to provide the desired outputs at the appropriate instants.

Having thus described the synchronization circuits which permit adjusting the phase of the oscillator during transmission of a message, the manner in which the initial phase adjustment is performed before transmission of a message will now be explained.

To perform this initial adjustment, a special initialization sequence is transmitted before the message. At the receiving end, the phase error signal is extracted from the sequence by a circuit which comprises the main components of the circuit of FIG. 6 or 7, namely, the two multipliers 43, 44, the subtractor 45, and the narrow-bandpass filters 37 and 38 centered at frequencies $f_1$ and $f_2$.

Figure 9:
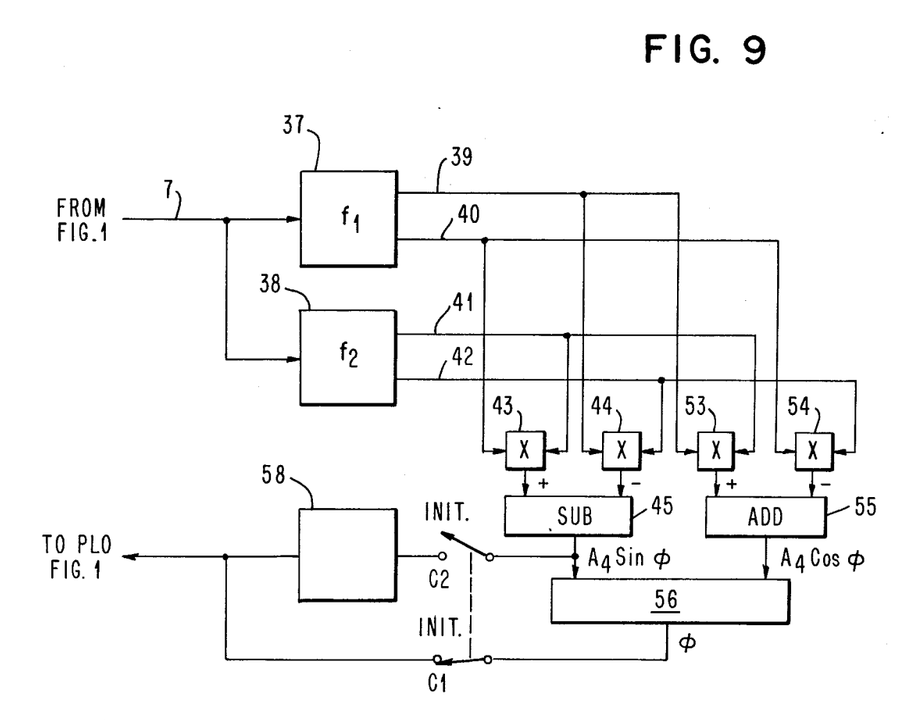
FIG. 9 illustrates a clock signal generator control device incorporating adjusting means which can be used during transmission and an additional initial adjusting means which can be used before transmission.

To perform said initial phase adjustment, a circuit is added to the circuit of FIG. 6 or 7. This complete circuit is shown in FIG. 9 and includes a multiplier 53 connected to outputs 39 and 41 of the filters, a multiplier 54 connected to outputs 40 and 42 of the filters, an adder 55 to combine the outputs of multipliers 53 and 54, and a circuit 56 which will generate from the outputs of subtractor 45 and adder 55, which are respectively $A_4$ sin φ and A₄ cos φ, the value of the phase error φ. The latter value will be applied through a switch C1, which is closed during the initialization phase, to oscillator 14 of FIG. 3 to correct the initial phase error of the oscillator.

During this initialization phase, the error signal A₄ sin φ is not sent to the control loop 47, FIG. 6, or 57, FIG. 7, which is used under normal operating conditions and is referenced in FIG. 9 as circuit 58. For this reason, the switch C2 is open during the initialization phase. Conversely, C2 is closed and C1 is open during data reception.

The operation of the circuit in the initialization mode will now be described. Preferably, the initialization sequence consists of a series of values $+1, -1, +1, \ldots$, sent at the transmission rate 1/T. Such a sequence modulated by carrier frequency $f_c$ exhibits two spectral lines at the Nyquist frequencies $f_1$ and $f_2$, and a sine wave of frequency $f_1 - f_2$ and of phase $\phi = \phi_1 - \phi_2$ representing the phase difference between the oscillator and the received signal can easily be reconstructed by filtering.

The received signal corresponding to that sequence will be passed through the filters 37 and 38 and, as before, subtractor 45 will provide an output signal every period T.

$$A_4 \sin(\phi_2 - \phi_1) = A_4 \sin \phi$$

where φ represents the initial phase difference.

Adder 55 will perform the operation $$A_4 \{\cos(2\pi f_1 k\tau + \phi_1) \cos(2\pi f_2 k\tau + \phi_2) + \sin(2\pi f_1 k\tau + \phi_1) \sin(2\pi f_2 k\tau + \phi_2)\} = A_4 \cos[2\pi(f_2 - f_1)k\tau + \phi_2 - \phi_1]$$

and will provide, at the signal instants, a signal $$A_4 \cos(\phi_2 - \phi_1) = A_4 \cos \phi$$

Circuit 56 receives the values A₄ sin φ and A₄ cos φ and supplies the value of φ that is used to correct the phase of the oscillator to render φ equal to zero.

Circuit 56 is of a known type. For example, such a circuit is shown in French Pat. No. 71 47850 filed by the same assignee on Dec. 21, 1971 and corresponding to assignee's U.S. Pat. No. 3,825,737 issued July 23, 1974 to Alain Croisier.

While the invention has been particularly shown and described with reference to preferred embodiments thereof, it will be understood by those skilled in the art that various changes in form and detail may be made therein without departing from the spirit and scope of the invention.

What is claimed is:

1. A synchronization method for adjusting the phase of a phase-locked oscillator which provides clocking signals to a data receiving device of a digital data synchronous transmission system to define to the receiving device, the sampling times of the signal of said system, said method characterized in that it includes the steps of:
   filtering a digital representation of the received signal to derive therefrom a first signal exhibiting a phase $\phi_1$ and a frequency $f_1 = f_c - \frac{1}{2}T$, with $f_c$ being the signal carrier frequency of said system and 1/T the signaling rate,
   also filtering said digital representation of the received signal to derive therefrom a second signal exhibiting a phase $\phi_2$ and a frequency $f_2 = f_c + \frac{1}{2}T$,
   combining said first and said second signals to generate an error signal indicative of the phase differential $\phi_2 - \phi_1$, and
   applying said error signal to the phase-locked oscillator to adjust the phase of the clock signal provided by said oscillator in a direction tending to render said error signal equal to zero.

2. In a digital data transmission system having signal transmitting means and a signal receiver including a sampling clock, a synchronization device for adjusting the phase of the sampling clock signals which define the sampling instants of the signal as received by the receiver, said synchronization device characterized in that it includes:
   a phase control circuit for deriving from samples of the received signal, a phase error signal, said phase control circuit comprising:
   a first filter connected to said transmission means for extracting from samples of the received signal, a signal component S1 of phase $\phi_1$ and of frequency $f_1 = f_c - \frac{1}{2}T$, with $f_c$ being the carrier frequency and 1/T the signaling rate,
   a second filter also connected to said transmission means for extracting from said samples of the received signal, a signal component S2 of phase $\phi_2$ and of frequency $f_2 = f_c + \frac{1}{2}T$,
   a circuit connected to both said first and second filters and generating from said two components S1 and S2, an error signal indicative of the phase difference $\phi_2 - \phi_1$ of said two components, and
   means to apply said error signal as a phase corrective signal to said oscillator.

3. A synchronizing device according to claim 2, characterized in that:
   said first filter has two outputs, the first of which outputs provides a filtered signal of frequency $f_1$ and of phase $\phi_1$ and the second of which supplies a filtered signal of frequency $f_1$ and of phase $\phi_1 - \pi/2$,
   said second filter also has two outputs, the first of which provides a filtered signal of frequency $f_2$ and of phase $\phi_2$, and the second of which provides a filtered signal of frequency $f_2$ and of phase $\phi_2 - \pi/2$, and
   all of said four filtered signals are applied to said error signal generating circuit to participate in generation of said error signal.

4. A synchronizing device as set out in claim 3, characterized in that said error signal generating circuit includes:
   a first multiplier receiver said first output of said first filter and said second output of said second filter to generate their product,
   a second multiplier receiving said second output of said first filter and said first output of said second filter to generate their product, and
   a subtractor receiving said two multiplier outputs to provide the difference between said two products and which generates an output signal of frequency $(f_2 - f_1)$ and of phase $(\phi_2 - \phi_1)$.

5. A synchronizing device as claimed in claim 4, characterized in that the signal provided by said subtractor at each sampling instant is of the form $A F(\phi_2 - \phi_1)$ and reduces to zero when $\phi_2 = \phi_1$.

6. A synchronizing device as set out in claim 5, characterized in that it includes a third multiplier receiving said error signal and acting to multiply said signal by a first constant coefficient, and a connection supplying the output of said third multiplier to said phase locked oscillator as an error signal.

7. A synchronizing device as claimed in claim 6, characterized in that it includes a fourth multiplier receiving said error signal to multiply said error signal by a second instant coefficient and wherein said connection to said phase locked oscillator includes an adder receiving the outputs of said third and fourth multipliers to provide their sum as said error signal.

8. A synchronizing device as set out in claim 4, characterized in that said control circuit includes an alternatively active circuit for deriving the phase error of said clock signal, before the start of data transmission, from a repetitive initialization sequence which exhibits two spectral lines at frequencies $f_1$ and $f_2$.

* * * * *